(12) United States Patent
Ortiz-Gavin

(10) Patent No.: US 7,909,492 B2
(45) Date of Patent: Mar. 22, 2011

(54) REFLECTOR MOUNTING APPARATUS

(76) Inventor: Sergio Alejandro Ortiz-Gavin, Los Angeles, CA (US)

( * ) Notice: Subject to any disclaimer, the term of this patent is extended or adjusted under 35 U.S.C. 154(b) by 175 days.

(21) Appl. No.: 12/192,533

(22) Filed: Aug. 15, 2008

(65) Prior Publication Data

US 2010/0039791 A1  Feb. 18, 2010

(51) Int. Cl.
*F21V 17/02* (2006.01)
*F16M 11/00* (2006.01)

(52) U.S. Cl. ........ 362/449; 362/432; 248/689; 248/569; 248/125.2

(58) Field of Classification Search .............. 362/449, 362/450, 432, 3, 16, 17, 18, 346, 341, 352, 362/433
See application file for complete search history.

(56) References Cited

U.S. PATENT DOCUMENTS

| | | | | |
|---|---|---|---|---|
| 1,683,270 | A * | 9/1928 | Taylor et al. | 343/869 |
| 3,294,962 | A * | 12/1966 | Hilzen | 362/13 |
| 4,692,844 | A * | 9/1987 | Galerne | 362/3 |
| D345,856 | S | 4/1994 | Johnson | |
| D396,185 | S | 7/1998 | Fraser | |
| 5,836,327 | A | 11/1998 | Davis | |
| D415,017 | S | 10/1999 | Lo | |
| 6,315,256 | B1 * | 11/2001 | Tolar | 248/230.4 |
| D477,906 | S | 8/2003 | Martin | |
| D504,221 | S | 4/2005 | Protano | |
| D510,656 | S | 10/2005 | Brewer | |
| D553,971 | S | 10/2007 | Krueger | |
| D574,144 | S | 8/2008 | Ortiz-Gavin | |
| 7,452,111 | B2 * | 11/2008 | Mazzei | 362/346 |

FOREIGN PATENT DOCUMENTS

EM  000946918-0001  7/2008

OTHER PUBLICATIONS

Photograph AA. Photo of an reflector umbrella mounting device in use since approximately 1998.
Photograph BB. Photo of another reflector mounting device in use since approximately 1998.

* cited by examiner

*Primary Examiner* — Sandra L O Shea
*Assistant Examiner* — Danielle Allen
(74) *Attorney, Agent, or Firm* — Edward C. Schewe

(57) ABSTRACT

A mounting apparatus for reflectors such as reflector umbrellas for lighting used in motion picture and still photography. The apparatus secures the reflector by retaining elements and the reflector may be removed efficiently from the apparatus and replaced by another reflector if desired by rotating one of the retaining elements about a hinge. The angular position of the reflector may be adjusted by rotating supports for the retaining elements to desired angular configurations by activation of a gear mechanism in a housing. The apparatus includes an indicator that indicates the position or angular orientation of the reflector and allows a user to orient the reflector into one or more desired angular configurations and remove the reflector while maintaining the orientation of the supports.

11 Claims, 4 Drawing Sheets

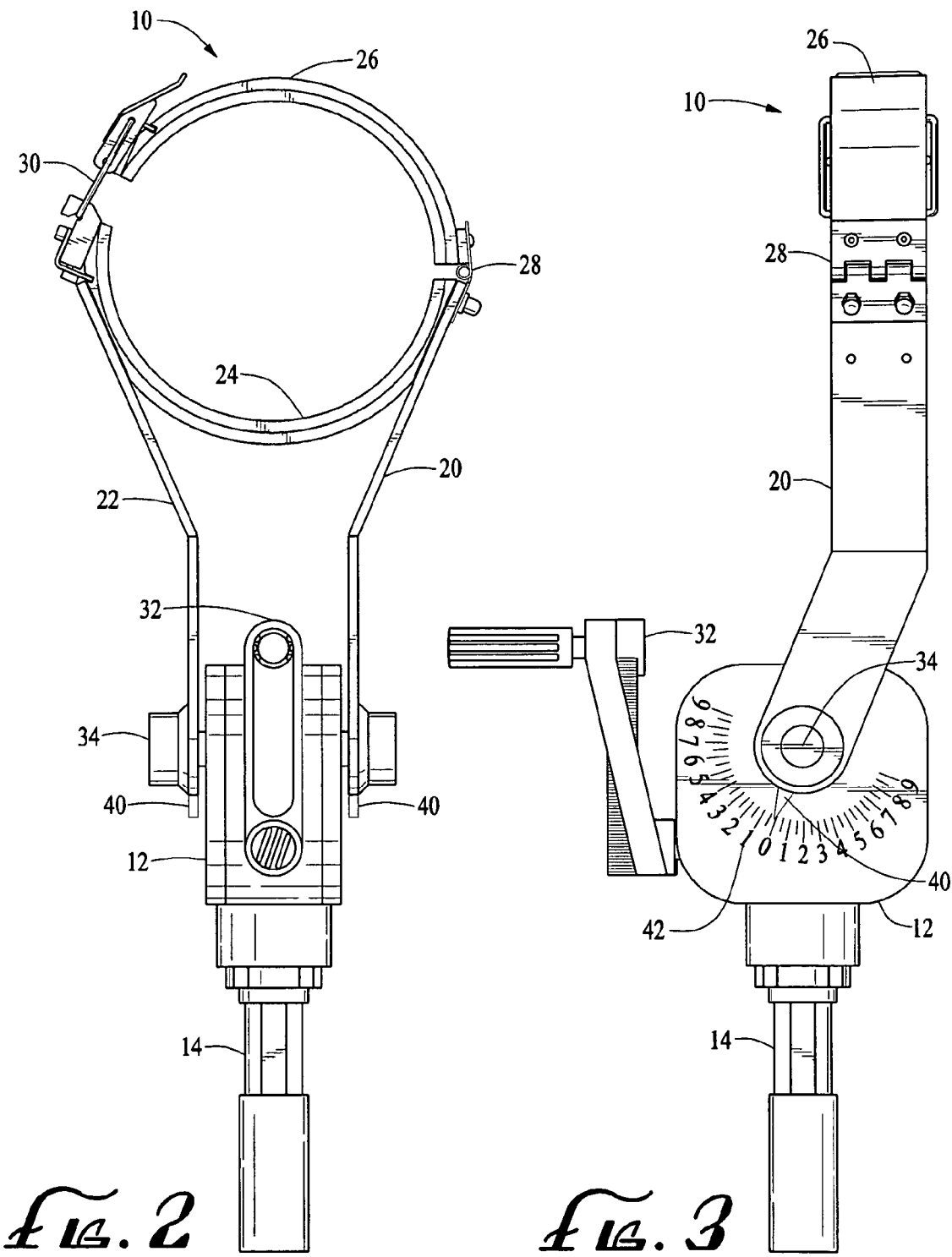

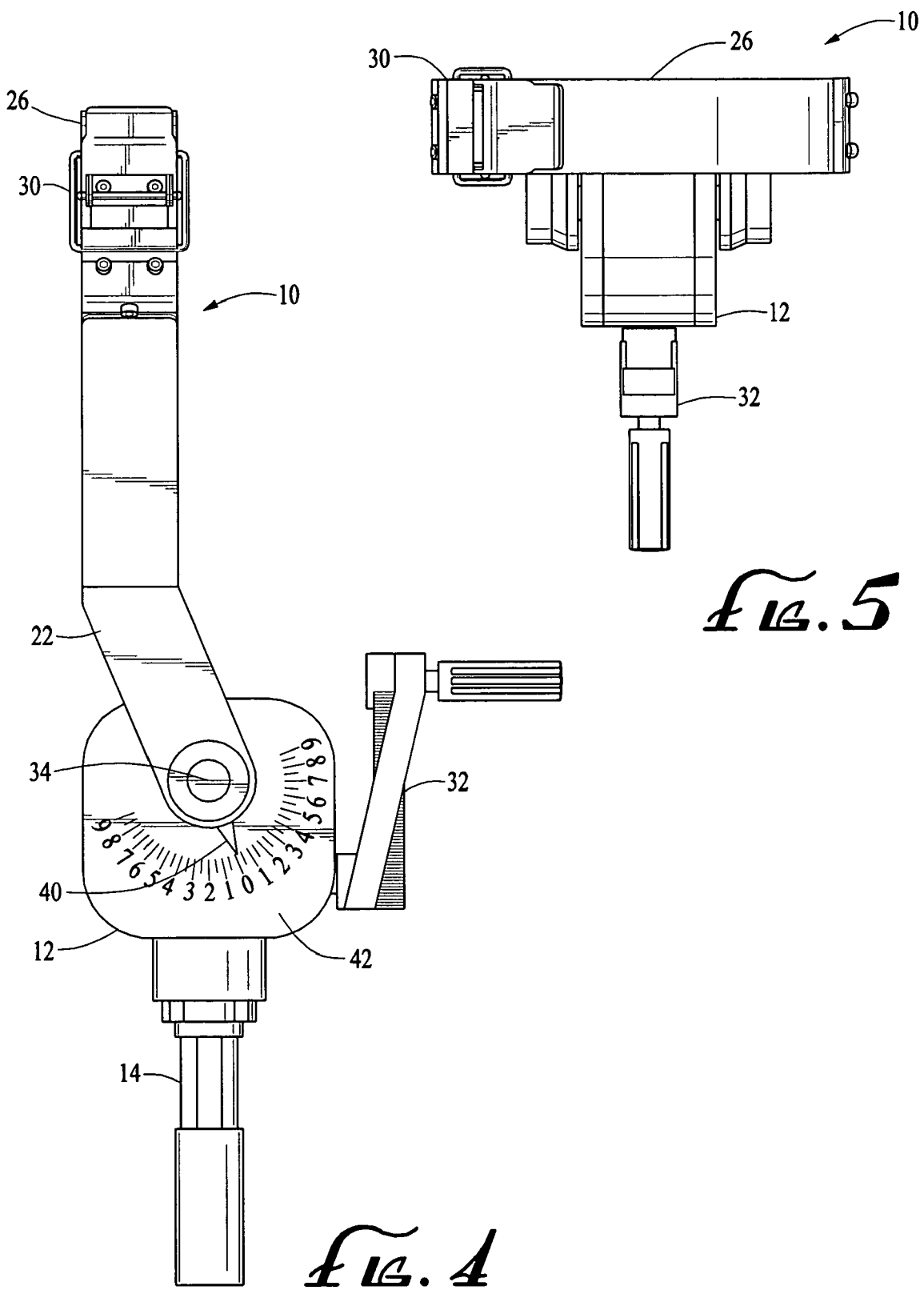

REFLECTOR MOUNTING APPARATUS

BACKGROUND OF THE INVENTION

1. Field of the Invention

The invention relates generally to a mounting apparatus for reflectors used in stage and studio lighting, and motion picture, video, film and still photography and more specifically is directed to an apparatus for mounting, securing, quickly removing and adjusting the positioning of reflectors and the like used for lighting for still and motion picture photography.

2. Description of the Related Art

Reflectors are often used for still and motion picture lighting. However, conventional devices used to mount the reflectors are cumbersome to use and do not permit the reflector to be quickly removed from the mount for replacement by another reflector. Thus, a need exists for apparatus that overcome the problems and disadvantages in conventional reflector mounts and allow quick removal and adjustment of the position of the reflectors used for lighting for still and motion picture photography.

SUMMARY OF THE INVENTION

A mounting apparatus for reflectors such as reflector umbrellas for lighting used in motion picture and still photography. The apparatus secures the reflector by retaining elements and the reflector may be removed from the apparatus by rotating one of the retaining elements about a hinge thus allowing removal of the reflector and if desired, replacing the reflector with a different reflector.

The invention improves on conventional devices in that the reflector and its associated lighting elements do not need to be disassembled before removal from the mounting apparatus using the present invention. In some conventional devices, the light source, any associated shield, the light source retaining element and the power source or head would all have to be removed in order to remove the reflector from a conventional mount. The user would then need to reassemble the device in order to use that same device at a different location.

With the present invention, a user can quickly remove the reflector and the light source from a first mounting apparatus while still under power and go to a hand-held operation for a dynamic shot or move the reflector and light source to a different location for example, on a different stage or set where a motion picture is being shot. The user can then return the reflector to the original stage or set, place the reflector into the first mounting apparatus and resume shooting without the need to reposition the reflector because the original position for the reflector in the first mounting apparatus is not changed. The present invention solves this and other problems with conventional devices.

In embodiments of the invention, the apparatus includes a housing that engages a stand or other support device commonly used for lighting equipment. A first support and a second support extend from the housing. A first retaining element is secured between the first support and the second support and the second retaining element is connected to the first support by a hinge. In embodiments of the invention, the second retaining element is configured to secure a portion of a reflector between the first retaining element and the second retaining element and to allow removal of the portion of the reflector from between the first retaining element and the second retaining element by rotating the second retaining element about the hinge. In other embodiments, the first retaining element and the second retaining element are configured to removably secure a reflector between the first retaining element and the second retaining element with the reflector being removable from the first retaining element and the second retaining element by rotating the second retaining element about the hinge.

In embodiments of the invention, the second retaining element is removably secured to the second support by a latch. In embodiments of the invention, the first support and the second support are movably positioned at different angular configurations with respect to the housing. In embodiments, the housing comprises a gear mechanism and the first support and second support are coupled to the gear mechanism. In further embodiments, activation of the gear mechanism positions the first support and the second support at different angular configurations as desired by a user. In embodiments of the invention, the gear mechanism is activated by rotating a handle that is coupled to the gear mechanism and in other embodiments, the handle is removable from the gear mechanism.

In further embodiments, an indicator attached to at least one of the first support and the second support. The indicator such as v-shaped pointer is configured so that positioning of at least one of the first support and the second support places the indicator adjacent to indicia on the housing to indicate the position of the reflector. The indicia include numbers that indicate a setting known to the user or an angular configuration of the reflector and allow a user to orient the reflector into one or more desired angular configurations. Further advantages and embodiments of the invention will be apparent to persons skilled in the art from the drawings and description set forth herein.

BRIEF DESCRIPTION OF THE DRAWINGS

FIG. 2 is a front elevation view of one embodiment of the invention.

FIG. 3 is a side elevation view of one embodiment of the invention.

FIG. 4 is another side elevation view of one embodiment of the invention.

FIG. 5 is a top view of one embodiment of the invention.

DETAILED DESCRIPTION OF EMBODIMENTS OF THE INVENTION

Figure 1:
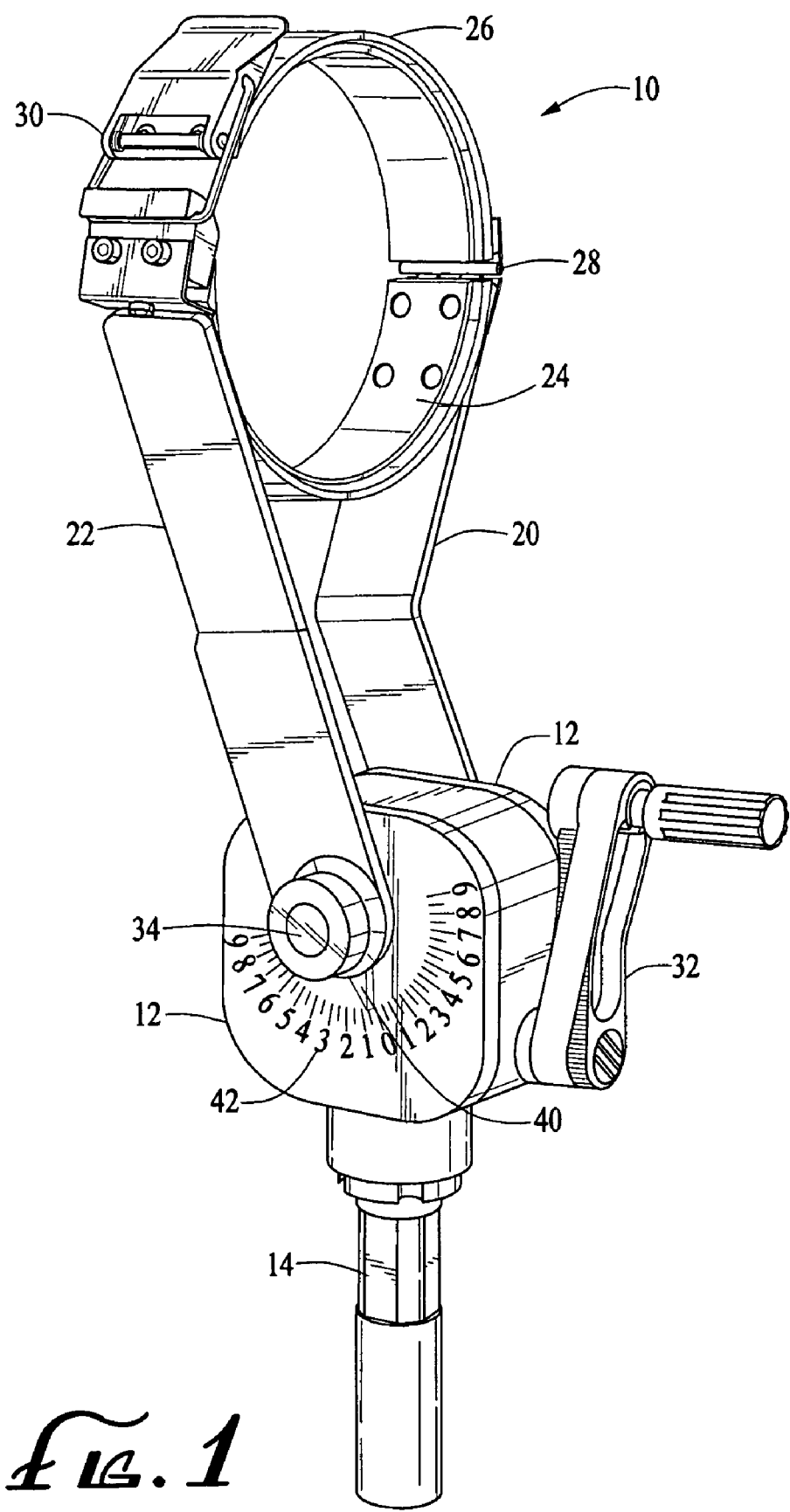
FIG. 1 is a perspective view of one embodiment of the invention.

FIG. 1 illustrates a reflector mounting apparatus 10. In the embodiment shown in FIG. 1, the apparatus 10 includes a housing 12 and a connector 14 attached to one part of the housing 12. The connector 14 is adapted to couple to a stand (not shown) including a conventional stand used for reflectors and well known to persons skilled in the art. In one or more embodiments, the connector 14 includes a variable cross sectional configuration and has a cylindrical cross-sectional configuration over a portion of its length as shown in FIG. 1 and in FIG. 7. Other cross sectional shapes and configurations for the connector 14 are also within the scope of the invention.

The apparatus 10 includes a first support 20 and a second support 22 extending outwardly away from the housing 12. The first retaining element 24 is secured between the first support 20 and the second support 22 as shown in FIG. 1 and is secured by appropriate connecting pins or other devices known to persons skilled in the art.

The second retaining element 26 is secured to the first support 20 by a hinge 28 and to the second support 22 by a latch 30 as shown in FIG. 1, FIG. 2 and FIG. 5. In one or more embodiments of the invention, the handle 32 is coupled to the gear mechanism (not shown) within the housing 12. The gear mechanism is coupled to the first support 20 and the second support 22 by gear connector 34. By rotating the handle 32 such as by hand, the first support 20 and second support 22 are movably positioned to different angular configurations with respect to the housing 12 in a manner well known to persons skilled in the art. The indicator 40 is positioned on the second support 22 as shown in FIG. 1 and also a second indicator 40 is positioned on the first support 20 as shown in FIG. 2 and FIG. 3.

Indicia 42 located on the housing 12 adjacent to either or both of the indicators 40 are arranged so that the indicator 40 is indicative of the angular position of the reflector mounted in the apparatus 10 by being placed adjacent to the appropriate portion of the indicia 42. In this manner, the indicator 40 point to that appropriate portion of the indicia 42 due to the placement of the first support 20 or second support 22. In one or more embodiments, the indicia 42 include numbers indicating the angle of the reflector or other designators that a user may need and known to persons skilled in the art.

FIG. 2 illustrates one embodiment of the invention with the first retaining element 24 and second retaining element 26 are configured to secure a portion of a reflector that has a substantially circular cross sectional shape. However, the invention includes an arrangement of the first retaining element 24 and second retaining element 26 so as to hold objects of other shapes and include a square, rectangular, triangular or irregular shape, all of which are within the scope of the present invention. The first retaining element 24 is secured onto the portion of the reflector by closing the latch 30 in a conventional manner. In the embodiments shown in FIG. 1 and FIGS. 2, 4 and 7, the latch includes a clip and a notched element for the clip. However, the latch 30 includes other attachment devices known to persons skilled in the art all of which are within the scope of the present invention.

Figures 6, 7:
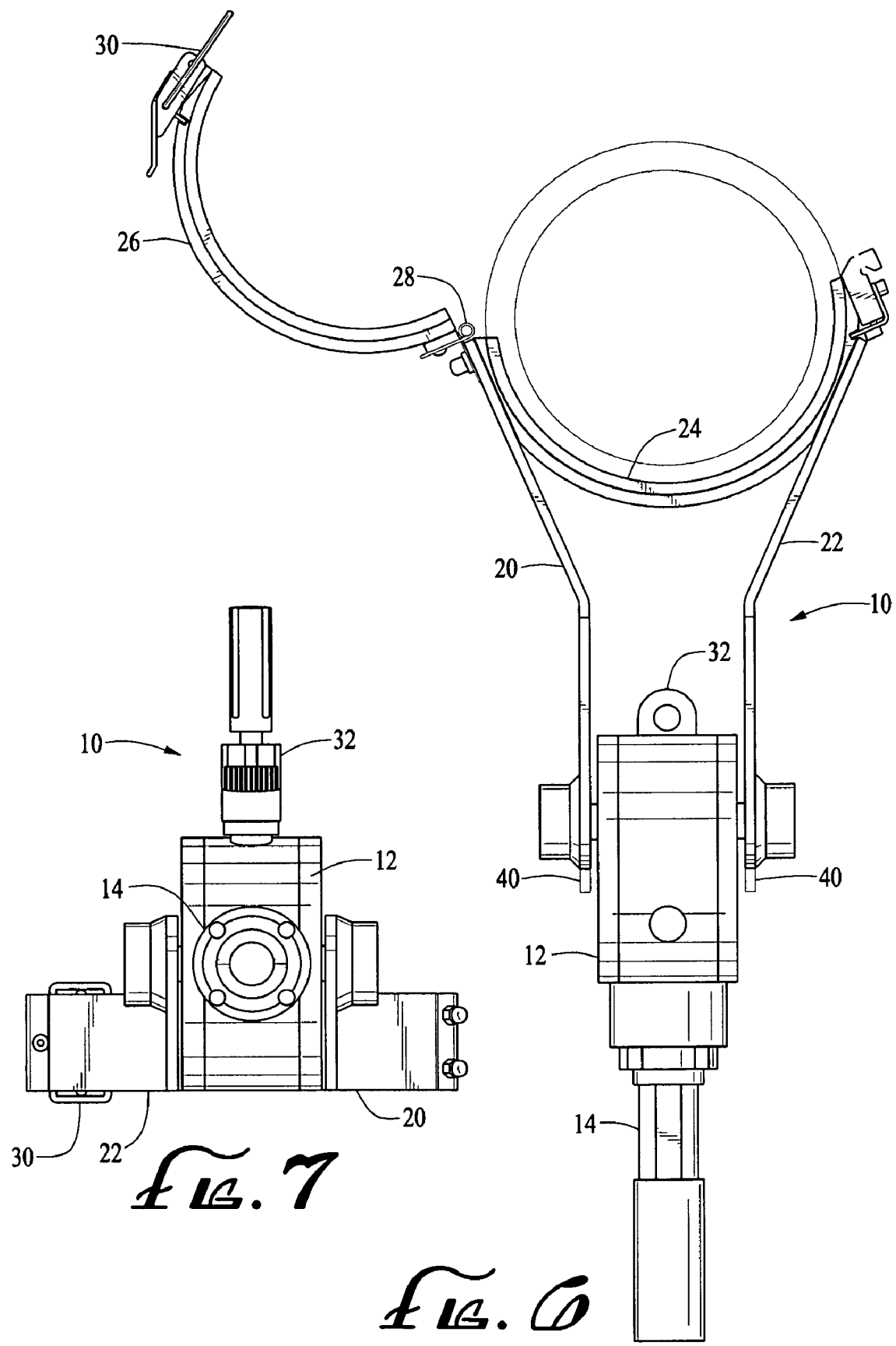
FIG. 6 is a rear elevation view of one embodiment of the invention.
FIG. 7 is a bottom view of one embodiment of the invention.

FIG. 6 illustrates on embodiment of the invention with the second retaining element 26 is rotated about the hinge 28 after the latch 30 is unhooked or opened so that a reflector may be removed from the apparatus. The angular position of the first support 20 and second support 22 is maintained. The hinge 28 includes any device or mechanism known to persons skilled in the art that permits movement of the second retaining element 26 to allow the reflector to be removed from the apparatus and those device and mechanisms are within the scope of the present invention.

While the present invention has been described with regards to particular embodiments, it is recognized that additional variations of the present invention may be devised without departing from the inventive concepts in the claims and the invention includes the full breadth and scope of the claims including all equivalents.

What is claimed is:

1. A reflector mounting apparatus comprising:
a housing adapted to engage a stand;
a first support and a second support, the first support and the second support extending from the housing;
a first retaining element secured between the first support and the second support;
a second retaining element connected to the first support by a hinge, the second retaining element configured to removably secure a portion of a reflector between the first retaining element and the second retaining element and to allow removal of the portion of the reflector from between the first retaining element, and the second retaining element by rotating-the second retaining element about the hinge.

2. The reflector mounting apparatus of claim 1 wherein the second retaining element is removably secured to the second support by a latch.

3. The reflector mounting apparatus of claim 1 wherein the first support and the second support are movably positioned at different angular configurations with respect to the housing.

4. The reflector mounting apparatus of claim 3 wherein the housing comprises a gear mechanism, the first support and second support coupled to the gear mechanisim so that activation of the gear mechanism positions the first support and the second support at the different angular configurations.

5. The reflector mpunting apparatus of claiin 4 wherein the gear mechanism is activated by rotating a handle coupled to the gear mechanism.

6. The reflector mounting apparatus of claim 5 wherein the handle is removable from the gear mechanism.

7. The reflector mounting apparatus of claim 3 further comprising an indicator attached to at least one of the first support and the second support, the indicator configured so that the positioning of at least one of the first support and the second support places the indicator adjacent to indicia on the housing to indicatate the position of the reflector.

8. The reflector mounting apparatus of claim 7 wherein the indicator and the indicia allow a user to orient the reflector into one or more desired angular configurations.

9. A reflector mountiting apparatus comprising:
a housing adapted to engage a stand;
a first support and a second support, the first support and the second support extending from the housing;
a first retaining element secured between the first support and the second support;
a second retaining element connected to the first support by a hinge adjacent to the first retaining element, the first retaining element and the second retaining element configured to removably secure a reflector between the first retaining element and the second retaining element, the reflector being removable from between the first retaining element and the second retaining element by rotating the second retaining element about the hinge.

10. The reflector mouniing apparatus of claim 9 wherein the orientation of the first support and the second support is maintained when the reflector is removed from the apparatus.

11. A reflector mounting apparatus comprising:
a housing adapted to engage a stand;
a first support and a second support, the first support and the second support extending from the housing, the first support and the second, support being movably positioned at different angular configurations with respect to the housing; and
a retaining element connected to the first support by a hinge and releasably secured to the second support by a latch, the retainin element configured to removably secure a portion of a reflector adjacent to both the first support and the second support and to allow removal of the portion of the reflector from the position adjacent to both the first support and the second support by rotating the retaining element about the hinge.

* * * * *